US011487485B2

(12) United States Patent
Kato et al.

(10) Patent No.: US 11,487,485 B2
(45) Date of Patent: Nov. 1, 2022

(54) ADVERTISEMENT SYSTEM AND METHOD OF CONTROLLING ADVERTISEMENT SYSTEM

(71) Applicant: SEIKO EPSON CORPORATION, Tokyo (JP)

(72) Inventors: Hideki Kato, Matsumoto (JP); Kan Matsuda, Shiojiri (JP); Tomomi Miyasaka, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 146 days.

(21) Appl. No.: 16/879,154

(22) Filed: May 20, 2020

(65) Prior Publication Data

US 2020/0371731 A1 Nov. 26, 2020

(30) Foreign Application Priority Data

May 22, 2019 (JP) ............................. JP2019-095788

(51) Int. Cl.
*G06F 3/12* (2006.01)
*G06Q 30/02* (2012.01)

(52) U.S. Cl.
CPC .......... *G06F 3/1243* (2013.01); *G06F 3/1205* (2013.01); *G06Q 30/0273* (2013.01); *G06Q 30/0276* (2013.01)

(58) Field of Classification Search
CPC . G06F 3/1243; G06F 3/1205; G06Q 30/0273; G06Q 30/0276
See application file for complete search history.

(56) References Cited

U.S. PATENT DOCUMENTS

| 2002/0016972 A1* | 2/2002 | Ogawa | H04N 7/165 725/133 |
| 2004/0103027 A1* | 5/2004 | Yamamoto | G06Q 30/0257 705/14.55 |
| 2009/0008202 A1* | 1/2009 | Dayton | G09F 3/08 190/100 |

FOREIGN PATENT DOCUMENTS

JP 2005-259018 9/2005

* cited by examiner

*Primary Examiner* — King Y Poon
*Assistant Examiner* — Michael L Burleson
(74) *Attorney, Agent, or Firm* — Workman Nydegger

(57) ABSTRACT

An advertisement system has a printer and a posting server that can communicate with the printer. The advertisement system uses the printer to issue a flyer on which advertisement images are printed. The posting server acquires a plurality of advertisement images of different advertisers, and selects a plurality of advertisement images from the plurality of acquired advertisement images according to a distribution period for the flyer, the distribution period being set for each acquired advertisement image. The posting server then creates print data involved in printing the plurality of selected advertisement images, and transmits the created print data to the printer. The printer receives the print data created by the posting server. To issue the flyer, the printer executes printing according to the received print data.

6 Claims, 9 Drawing Sheets

| 12B1 | 12B2 | 12B3 | |
|---|---|---|---|
| DISTRIBUTOR ID | ASSIGNED AREA INFORMATION | DISTRIBUTION DISAPPROVED DATE AND TIME INFORMATION | |
| AAA1 | AREA A | NONE | ← R1 |
| AAA2 | AREA A | NONE | ← R2 |
| AAA3 | AREA A | MM DD, YYYY | ← R3 |
| AAA4 | AREA A | NONE | ← R4 |
| AAA5 | AREA A | NONE | ← R5 |

⋮

ADVERTISEMENT SYSTEM AND METHOD OF CONTROLLING ADVERTISEMENT SYSTEM

The present application is based on, and claims priority from JP Application Serial Number 2019-095788, filed May 22, 2019, the disclosure of which is hereby incorporated by reference herein in its entirety.

BACKGROUND

1. Technical Field

The present disclosure relates to an advertisement system and a method of controlling the advertisement system.

2. Related Art

A system known in related art issues an advertisement medium on which an advertisement image is printed by a printing apparatus. For example, JP-A-2005-259018 discloses a system that receives image information for use for an advertisement from an advertiser and edits the image information to create design information about an advertisement, after which the system creates print information according to the created design information, executes printing based on the created print information at a location at which the advertisement is distributed, and issues a flyer, which is an advertisement medium.

However, the system described in JP-A-2005-259018 is based on the premise that image information transmitted from a single advertiser for use for advertisement is printed on a single medium. Therefore, the system cannot issue an advertisement medium on which advertisements of a plurality of advertisers are placed.

SUMMARY

An aspect to solve the above problem is an advertisement system having a printing apparatus and a server configured to communicate with the printing apparatus. The advertisement system uses the printing apparatus to issue an advertisement medium on which advertisement images are printed. The server acquires a plurality of advertisement images of different advertisers, selects a plurality of advertisement images from the plurality of acquired advertisement images according to a distribution period for the advertisement medium, the distribution period being set for each of the plurality of acquired advertisement images, creates print data involved in printing the plurality of selected advertisement images, and transmits the created print data to the printing apparatus. The printing apparatus receives the print data created by the server, and to issue the advertisement medium, executes printing according to the received print data.

In the advertisement system, an advertisement cost may be set by the advertiser for each advertisement image acquired by the server. When creating a plurality of pieces of print data, the server may select advertisement images according to a degree matching the set advertisement cost.

In the advertisement system, an advertisement cost may be set by the advertiser for each advertisement image acquired by the server. The server may adjust, for each selected advertisement image, the layout of the advertisement images according to the set advertisement cost.

In the advertisement system, a distribution target for the advertisement medium may be set by the advertiser for each advertisement image acquired by the server. In creation of the print data, the server may select advertisement images having a relationship in set distribution targets.

The advertisement system may have a terminal used by a distributor who distributes the advertisement medium. The terminal may be configured to communicate with the server and printing apparatus. The terminal may receive the print data from the server and may transmit the received print data to the printing apparatus. The server may transmit the created print data to the terminal and may notify the terminal of a distribution time limit for the advertisement medium issued according to the print data.

In the advertisement system, the server may monitor whether the advertisement medium has been distributed before the distribution time limit, for the advertisement medium, of which the terminal was notified, and may notify the advertiser of a monitoring result.

Another aspect to solve the above problem is a method of controlling an advertisement system having a printing apparatus and a server configured to communicate with the printing apparatus, the system using the printing apparatus to issue an advertisement medium on which advertisement images are printed. The server acquires a plurality of advertisement images of different advertisers, selects a plurality of advertisement images from the plurality of acquired advertisement images according to a distribution period for the advertisement medium, the distribution period being set for each of the plurality of acquired advertisement images, creates print data involved in printing the plurality of selected advertisement images, and transmits the created print data to the printing apparatus. The printing apparatus receives the print data created by the server, and to issue the advertisement medium, executes printing according to the received print data.

BRIEF DESCRIPTION OF THE DRAWINGS

FIG. 3 illustrates an example of a distributor management database.

DESCRIPTION OF EXEMPLARY EMBODIMENTS

Figure 1:
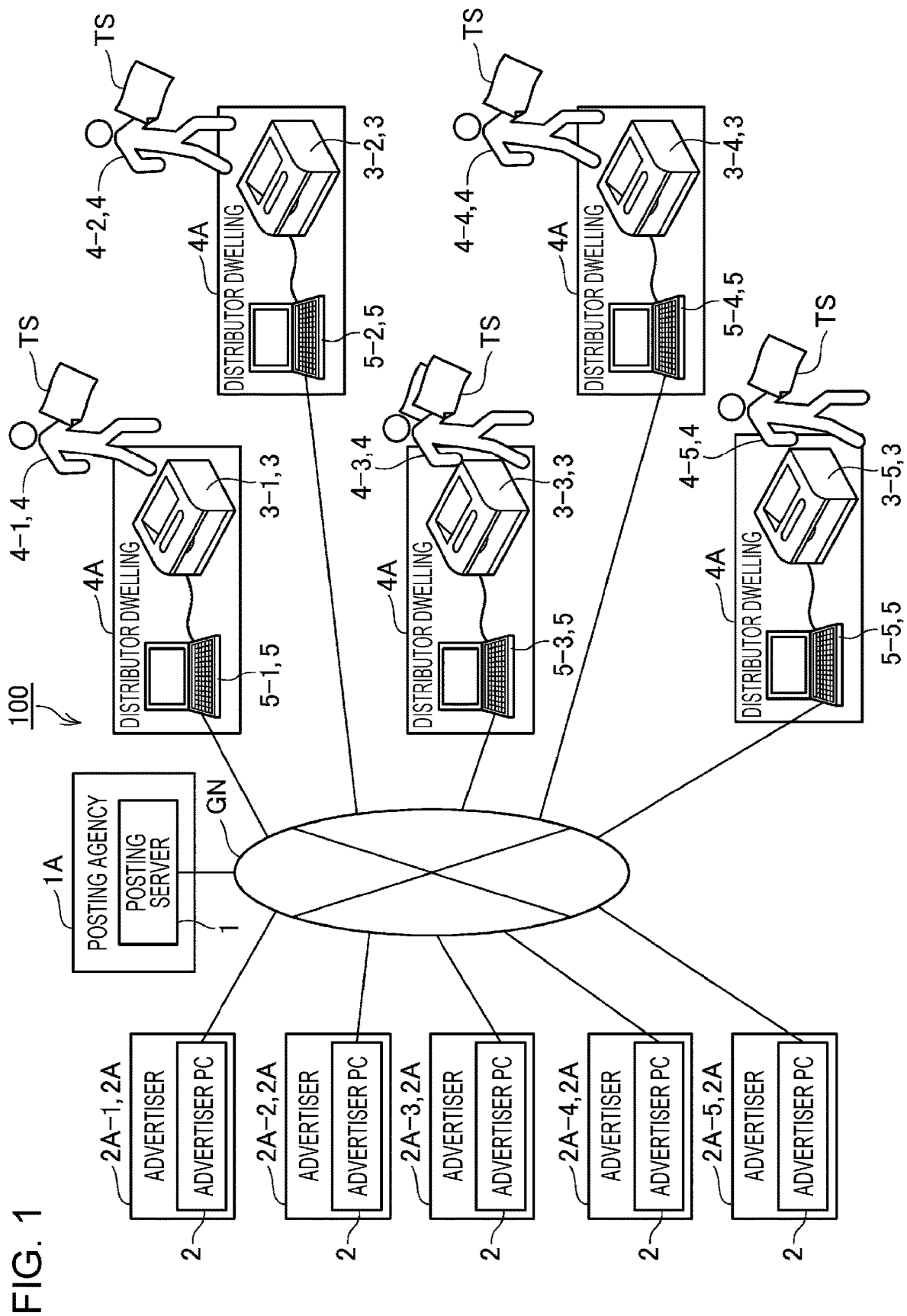
FIG. 1 illustrates the structure of an advertisement system.

FIG. 1 illustrates the structure of an advertisement system 100. The advertisement system 100 is used by a posting agency 1A. The posting agency 1A performs a business operation involved in distributing a flyer TS on which advertisements of a product, service, and the like of an advertiser 2A are placed. The flyer TS is a drawing indicating an example of an advertisement medium.

As illustrated in FIG. 1, the advertisement system 100 has a posting server 1. The posting server 1, which is a server apparatus managed by the posting agency 1A, is coupled to a global network GN. The posting server 1 is equivalent to an example of a server. Although, in the drawings, the posting server 1 is represented by a single block, this does not necessarily mean that the posting server 1 is a single server apparatus. For example, the posting server 1 may be structured by including a plurality of server apparatuses that execute different types of processing.

As illustrated in FIG. 1, the advertisement system 100 has printers 3, each of which is equivalent to an example of a printing apparatus. The printer 3 in this embodiment is a printing apparatus in a continuous ink supply system (CISS), in which an ink tank from which ink is supplied to an ink jet head can be replenished with the ink ex post facto. The printer 3 in this embodiment is exemplified by a stationary printing apparatus disposed in the dwelling of a distributor 4 who has a predetermined contract with the posting agency 1A to distribute a flyer TS. The distributor 4 is equivalent to an example of a person who makes a distribution. In the description below, the dwelling of the distributor 4 will be referred to as the distributor dwelling 4A. The printer 3 disposed in the distributor dwelling 4A may be owned by the distributor 4 or may be rented from the posting agency 1A.

In FIG. 1, five distributors 4 are illustrated. In this embodiment, the five distributors 4 in FIG. 1 are distributors 4 in an area A in which they take charge of distributing the flyer TS. That is, the same area is assigned to the five distributors 4 in FIG. 1. Although not illustrated, distributors 4 having a contract with the posting agency 1A include distributors 4 assigned to areas other than the area A. Although five distributors 4 are assigned to the area A, this is just an example. More distributors 4 or less distributors 4 may be assigned to the area A without being limited to five distributors 4.

As illustrated in FIG. 1, the advertisement system 100 has personal computers (PCs), each of which is coupled to the printer 3 disposed in one distributor dwelling 4A so that the PC can communicate with the printer 3. The PC is used by the relevant distributor 4. In the description below, the PC used by the distributor 4 will be referred to as the distributor PC 5. The distributor PC 5 is equivalent to an example of a terminal. The distributor PC 5 is coupled to the global network GN. In this embodiment, one distributor PC 5 is provided in one distributor dwelling 4A together with the printer 3 and controls the printer 3. The distributor PC 5 may be a PC owned by the distributor 4 or a PC rented from the posting agency 1A. The distributor PC 5 in this embodiment is exemplified by a laptop computer. However, the distributor PC 5 may be a desktop computer or a tablet computer. In this embodiment, a case is exemplified in which one printer 3 is coupled to the distributor PC 5. However, more printers 3 may be coupled to the distributor PC 5.

In this embodiment, the distributor 4-1 manipulates the distributor PC 5-1 to issue a flyer TS with the printer 3-1. Similarly, the distributor 4-2 manipulates the distributor PC 5-2 to issue a flyer TS with the printer 3-2, the distributor 4-3 manipulates the distributor PC 5-3 to issue a flyer TS with the printer 3-3. the distributor 4-4 manipulates the distributor PC 5-4 to issue a flyer TS with the printer 3-4, and the distributor 4-5 manipulates the distributor PC 5-5 to issue a flyer TS with the printer 3-5.

As illustrated in FIG. 1, a plurality of advertiser PCs 2, each of which is operated by one advertiser 2A, are coupled to the global network GN. In this embodiment, a case is exemplified in which five advertiser PCs 2 are coupled to the global network GN. A browser is preinstalled in each advertiser PC 2. The advertiser 2A activates the browser installed in the advertiser PC 2 and accesses a Web page provided by the posting agency 1A to request the posting agency 1A to distribute a flyer TS through the Web page. Although five advertiser PCs 2 are coupled to the global network GN, this is just an example. More advertiser PCs 2 or less advertiser PCs 2 may be coupled to the global network GN without being limited to five advertiser PCs 2.

Figure 2:
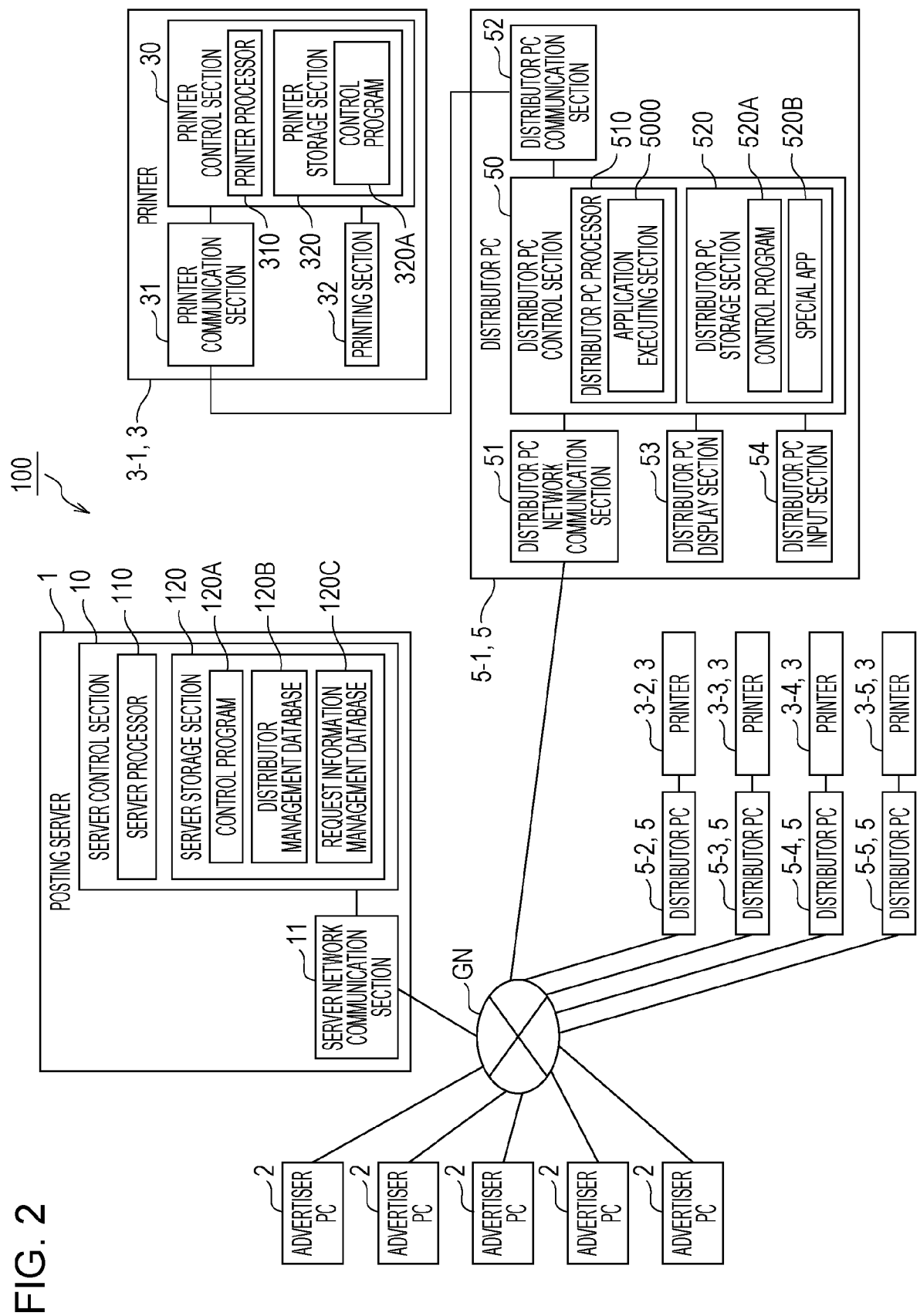
FIG. 2 illustrates the structures of apparatuses included in the advertisement system.

FIG. 2 is a block diagram illustrating the functional structures of apparatuses included in the advertisement system 100.

The posting server 1 has a server control section 10 and a server network communication section 11.

The server control section 10 has a server processor 110, which is a processor, such as a central processing unit (CPU) or a microprocessor unit (MPU), that executes programs, and also has a server storage section 120. The server control section 10 controls individual sections in the posting server 1. To have the server processor 110 read a control program 120A stored in the server storage section 120 and execute processing, the server control section 10 executes various types of processing in cooperation with hardware and software.

The server storage section 120 has a storage area in which programs to be executed by the server processor 110 and data to be processed by the server processor 110 are stored. The server storage section 120 stores the control program 120A to be executed by the server processor 110, a distributor management database 120B, a request information management database 120C, and various other types of data. The server storage section 120 has a non-volatile storage area that stores programs and data in a non-volatile manner. The server storage section 120 may also have a volatile storage area to form a work area that temporarily stores programs to be executed by the server processor 110 and data to be processed.

FIG. 3 illustrates an example of the distributor management database 120B.

One record in the distributor management database 120B includes a distributor identifier (ID) 12B1, assigned area information 12B2, and distribution disapproved date and time information 12B3.

In FIG. 3, the record R1 is a record related to the distributor 4-1, the record R2 is a record related to the distributor 4-2, the record R3 is a record related to the distributor 4-3, the record R4 is a record related to the distributor 4-4, and the record R5 is a record related to the distributor 4-5. The distributor management database 120B has as many records as there are distributors 4 having a predetermined contract with the posting agency 1A.

The distributor ID 12B1 is identification information that identifies a distributor 4. When a new record is to be stored in the distributor management database 120B, the distributor ID 12B1 is assigned to the distributor 4.

Assigned area information 12B2 indicates an assigned area in which the distributor 4 distributes a flyer TS. When a record is to be stored in the distributor management database 120B, assigned area information 12B2 is set by the distributor 4 or posting agency 1A.

Distribution disapproved date and time information 12B3 indicates a data and time at which the distributor 4 cannot distribute the flyer TS. When, for example, the distributor 4 manipulates the distributor PC 5 to use a function of a special application program, which will be described later, distribution disapproved date and time information 12B3 is set at a predetermined timing and is updated at another predetermined timing.

Figure 4:
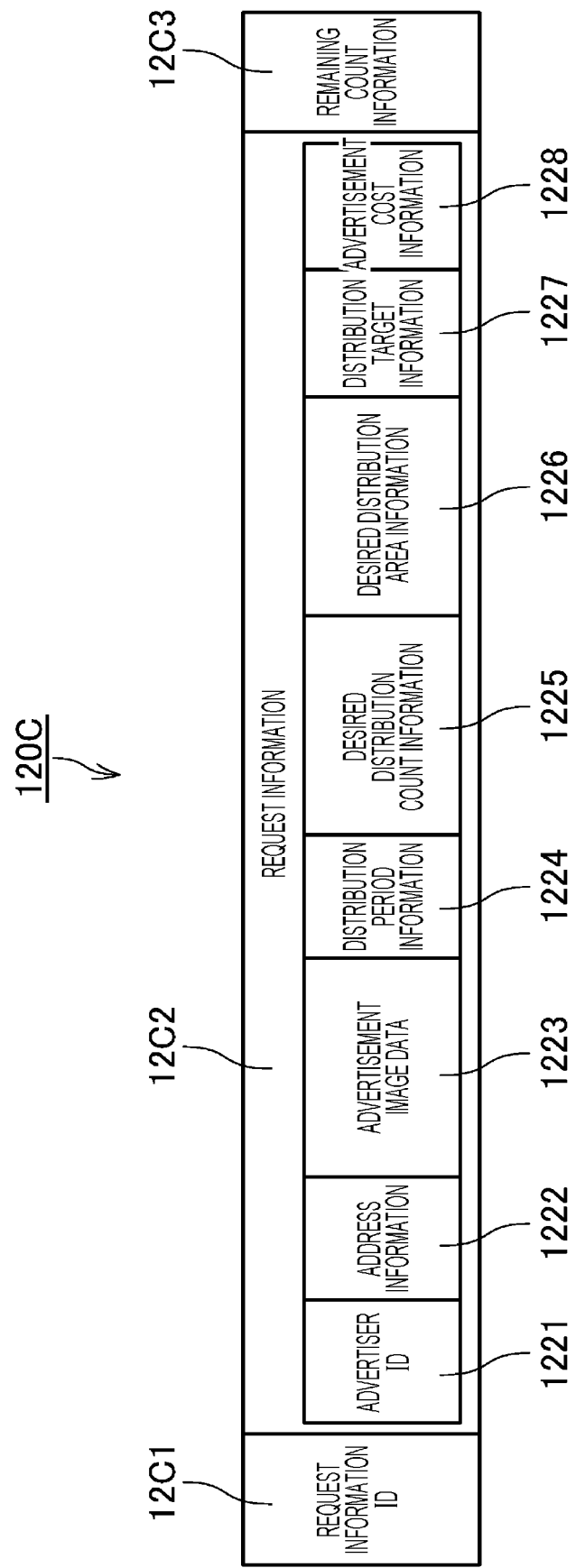
FIG. 4 illustrates an example of a request information management database.

FIG. 4 schematically illustrates information included in one record in the request information management database 120C.

As illustrated in FIG. 4, one record in the request information management database 120C includes a request information ID 12C1, request information 12C2, and remaining count information 12C3.

Request information ID 12C1 is identification information that identifies request information 12C2 received from the advertiser PC 2. Request information 12C2 will be described later.

Remaining count information 12C3 indicates the number of copies of a flyer TS that have yet to be distributed. When the distribution of the flyer TS has not been performed, the remaining count information 12C3 indicates the same number of copies as the desired distribution count, included in request information 12C2, for the flyer TS. The desired distribution count indicates the distribution count for the flyer TS by which the advertiser 2A desires to make a distribution.

When the server control section 10 in the posting server 1 receives request information 12C2 from the advertiser PC 2 through the server network communication section 11, the server control section 10 creates request information ID 12C1 and associates the created request information ID 12C1 with the received request information 12C2. The server control section 10 takes the desired distribution count, indicated by the request information 12C2, for the flyer TS as the remaining number of copies of the flyer TS that have yet to be distributed, and associates the remaining count information 12C3 with the received request information 12C2. The server control section 10 then stores, in the request information management database 120C, a record in which the request information ID 12C1 and remaining count information 12C3 are associated with the request information 12C2.

The server network communication section 11 has communication hardware complying with a predetermined communication standard. Under control of the server control section 10, the server network communication section 11 communicates with devices coupled to the global network GN according to the predetermined communication standard. The devices, referred to here, coupled to the global network GN include advertiser PCs 2 and distributor PCs 5. Examples of the communication standard used by the server network communication section 11 for communication include the Hypertext Transfer Protocol (HTTP) and WebSocket.

The distributor PC 5 has a distributor PC control section 50, a distributor PC network communication section 51, a distributor PC communication section 52, a distributor PC display section 53, and a distributor PC input section 54.

The distributor PC control section 50 has a distributor PC processor 510, which is a processor, such as a CPU or MPU, that executes programs, and also has a distributor PC storage section 520. The distributor PC control section 50 controls individual sections in the distributor PC 5. To have the distributor PC processor 510 read a control program 520A stored in the distributor PC storage section 520 and execute processing, the distributor PC control section 50 executes various types of processing in cooperation with hardware and software. A special application program is preinstalled in the distributor PC 5. In the description below, the special application program will be simply referred to as the special app 520B. When the special app 520B is read from the distributor PC storage section 520 by the distributor PC processor 510 and is executed by it, the special app 520B causes the distributor PC control section 50 to function as an application executing section 5000. Functions of the application executing section 5000 will be described later.

The distributor PC storage section 520 has a storage area in which programs to be executed by the distributor PC processor 510 and data to be processed by the distributor PC processor 510 are stored. The distributor PC storage section 520 stores the control program 520A to be executed by the distributor PC processor 510, the special app 520B, and various types of data. The distributor PC storage section 520 has a non-volatile storage area that stores programs and data in a non-volatile manner. The distributor PC storage section 520 may also have a volatile storage area to form a work area that temporarily stores programs to be executed by the distributor PC processor 510 and data to be processed.

The distributor PC network communication section 51 has communication hardware complying with a predetermined communication standard. Under control of the distributor PC control section 50, the distributor PC network communication section 51 communicates with devices coupled to the global network GN according to the predetermined communication standard. In this embodiment, the device, coupled to the global network GN, with which the distributor PC network communication section 51 communicates is the posting server 1. Examples of the communication standard used by the distributor PC network communication section 51 for communication include the HTTP and WebSocket.

The distributor PC communication section 52 is structured by communication hardware complying with a predetermined communication standard. Under control of the distributor PC control section 50, the distributor PC communication section 52 communicates with the printer 3. The communication standard for communication between the distributor PC 5 and the printer 3 may be a wireless communication standard or may be a wired communication standard.

The distributor PC display section 53 has a display panel. Under control of the distributor PC control section 50, the 53 displays various types of information on the display panel.

The distributor PC input section 54 has a keyboard, a mouse, and other input devices. The distributor PC input section 54 detects a manipulation performed by the user with an input device, and outputs the detection result to the distributor PC control section 50. The distributor PC control section 50 executes processing corresponding to the manipulation performed by the user with the input device, according to the input from the distributor PC input section 54.

The printer 3 has a printer control section 30, a printer communication section 31, and a printing section 32.

The printer control section 30 has a printer processor 310, which is a processor, such as a CPU or MPU, that executes programs, and also has a printer storage section 320. The printer control section 30 controls individual sections in the printer 3. To have the printer processor 310 read a control program 320A stored in the printer storage section 320 and execute processing, the printer control section 30 executes various types of processing in cooperation with hardware and software.

The printer storage section 320 has a storage area in which programs to be executed by the printer processor 310 and data to be processed by the printer processor 310 are stored. The printer storage section 320 stores the control program 320A to be executed by the printer processor 310 and various types of data. The printer storage section 320 has a non-volatile storage area that stores programs and data in a non-volatile manner. The printer storage section 320 may also have a volatile storage area to form a work area that temporarily stores programs to be executed by the printer processor 310 and data to be processed.

The printing section 32 has an ink jet head that discharges ink to a print medium to form dots, a carriage that moves the ink jet head in the scanning direction, a carriage driving motor that drives the carriage, a transport unit that transports the print medium, an ink tank from which ink is supplied to the ink jet head, and other constituent components involved in printing. The printing section 32 prints an image on a print medium under control of the printer control section 30. Particularly, the printing section 32 in this embodiment prints advertisement images KG on a print medium according to print data received from the posting server 1 through the distributor PC 5 to issue a flyer TS.

Next, the operation of the advertisement system 100 will be described.

Figure 5:
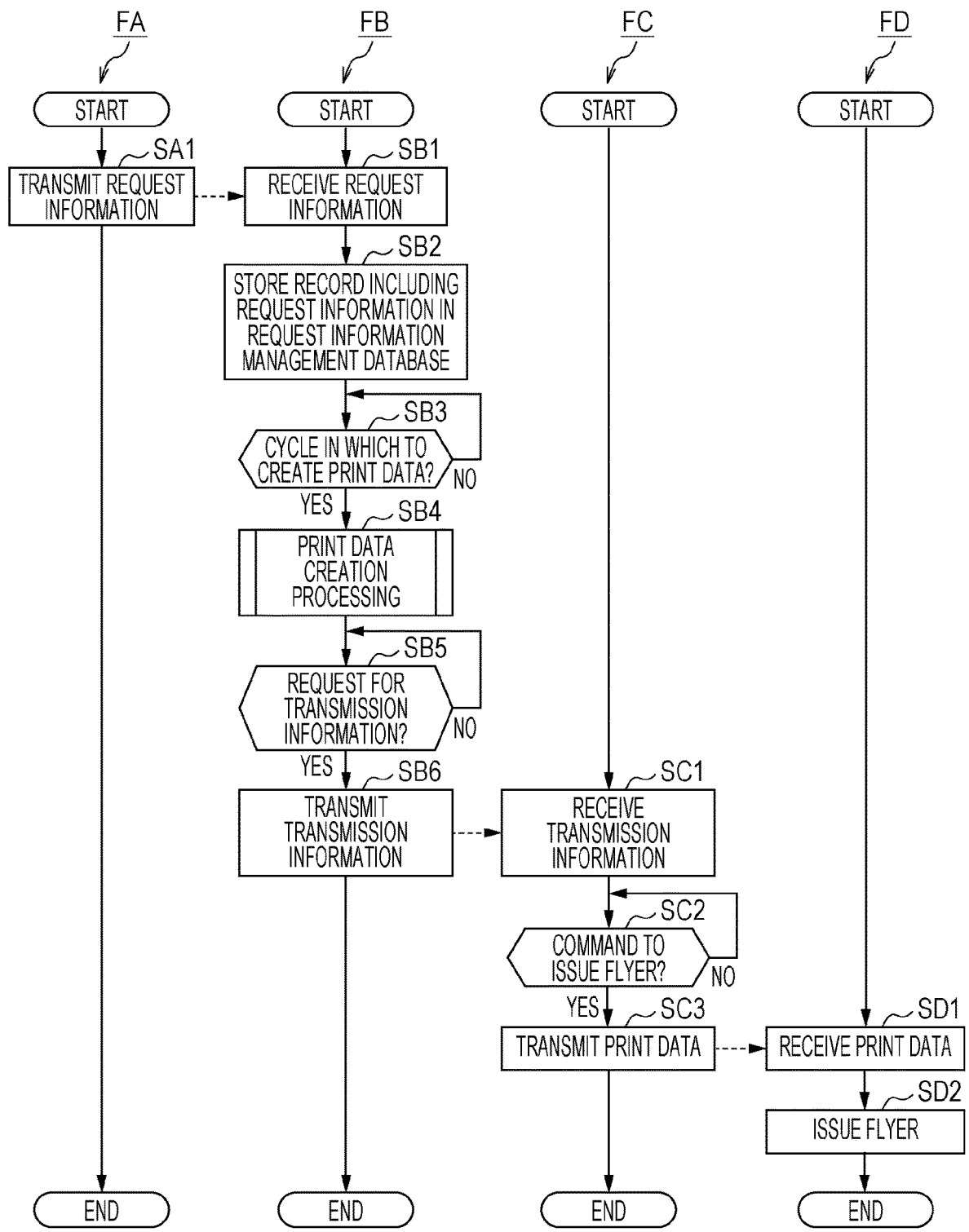
FIG. 5 is flowcharts illustrating the operation of the advertisement system.

FIG. 5 is flowcharts illustrating the operation of the advertisement system 100. In FIG. 5, the flowchart FA indicates the operation of the advertiser PC 2, the flowchart FB indicates the operation of the posting server 1, the flowchart FC indicates the operation of the distributor PC 5, and the flowchart FD indicates the operation of the printer 3. The operation illustrated in FIG. 5 is performed until the advertisement system 100 issue a flyer TS with the printer 3.

In the operation of the advertisement system 100 in FIG. 5, print data is created that is used by the posting server 1 to issue a flyer TS at predetermined intervals.

As indicated by the flowchart FA, the advertiser PC 2 transmits request information 12C2 to the posting server 1 in response to the manipulation by the advertiser 2A (step SA1).

Here, the operation of the advertiser PC 2 until request information 12C2 is transmitted to the posting server 1 will be described together with details of request information 12C2.

The advertiser 2A manipulates the advertiser PC 2 to activate the browser installed in the advertiser PC 2. The advertiser 2A then commands the advertiser PC 2 to access a Web page on which the advertiser 2A requests the distribution of a flyer TS. The advertiser 2A is notified of the uniform resource locator (URL) of the Web page in advance by a predetermined method.

After having accessed the URL, the advertiser PC 2 receives, from the posting server 1, a hypertext markup language (HTML) file that displays the Web page, and displays the Web page on the display panel according to the received HTML file.

On the displayed Web page, the advertiser 2A manipulates the advertiser PC 2 to enter information involved in a request for the distribution of a flyer TS.

In this embodiment, information involved in a request for the distribution of a flyer TS, the information being entered by the advertiser 2A, includes an advertiser ID 1221, address information 1222, advertisement image data 1223, distribution period information 1224, desired distribution count information 1225, desired distribution area information 1226, and distribution target information 1227.

The advertiser ID 1221 is identification information that identifies the advertiser 2A. The advertiser 2A is notified of the advertiser ID 1221 in advance by a predetermined method.

Address information 1222 is used to transmit predetermined information to the advertiser PC 2. An example of address information 1222 is a mail address or the like.

Advertisement image data 1223 is image data of an advertisement image KG representing an advertisement of the advertiser 2A. Advertisement image data 1223 is created by a predetermined application program installed in the advertiser PC 2.

Distribution period information 1224 indicates a distribution period for the flyer TS, the distribution period including a distribution time limit for the flyer TS.

Desired distribution count information 1225 indicates a desired distribution count that is the number of copies of the flyer TS by which the advertiser 2A desires to make a distribution.

Desired distribution area information 1226 indicates a desired distribution area in which the distribution of the flyer TS is desired.

Distribution target information 1227 indicates a distribution target to which to distribute the flyer TS. Examples of the target are students, residents in apartments, and the like.

When the advertiser 2A enters distribution target information 1227 as information involved in a request for the distribution of the flyer TS, the distribution target is set in the advertisement image KG indicated by the entered advertisement image data 1223.

When the advertiser 2A has completed the entry of information involved in a request for the distribution of the flyer TS on the Web page, the advertiser PC 2 transmits, to the posting server 1, request information 12C2 indicating the request for the distribution of the flyer TS. This request information 12C2 includes advertisement cost information 1228, besides the information entered to the Web page by the advertiser 2A to request the distribution of the flyer TS. Advertisement cost information 1228 indicates an advertisement cost required for the distribution of the flyer TS. The advertisement cost is calculated by a function of the HTML file according to the entered information when the entry of information involved in a request for the distribution of the flyer TS is completed. In this embodiment, a cost matching the desired distribution count indicated by desired distribution count information 1225 is exemplified as the advertisement cost. However, the advertisement cost may be varied according to other factors. For example, the advertisement cost may be varied according to the size of the advertisement image KG printed on the flyer TS or the desired distribution area indicated by the entered desired distribution area information 1226.

When advertisement cost information 1228 is included in request information 12C2, the advertisement cost is set for the advertisement image KG indicated by the advertisement image data 1223 included in the request information 12C2.

Referring again to FIG. 5, as indicated in the flowchart FB, when the server control section 10 in the posting server 1 receives request information 12C2 from the advertiser PC 2 (step SB1), the server control section 10 creates a record including the request information 12C2 and stores the created record in the request information management database 120C (step SB2).

Next, the server control section 10 decides whether a cycle in which to create print data has come (step SB3).

When the server control section 10 decides that a cycle in which to create print data has not yet come (No in step SB3), the server control section 10 makes a decision again in step SB3. When the server control section 10 receives request information 12C2 before the server control section 10 makes an affirmative decision in step SB3, the server control section 10 creates a record including the received request information 12C2 and stores the created record in the request information management database 120C.

When the server control section 10 decides that a cycle in which to create print data has come (Yes in step SB3), the server control section 10 executes print data creation processing (step SB4).

Figure 6:
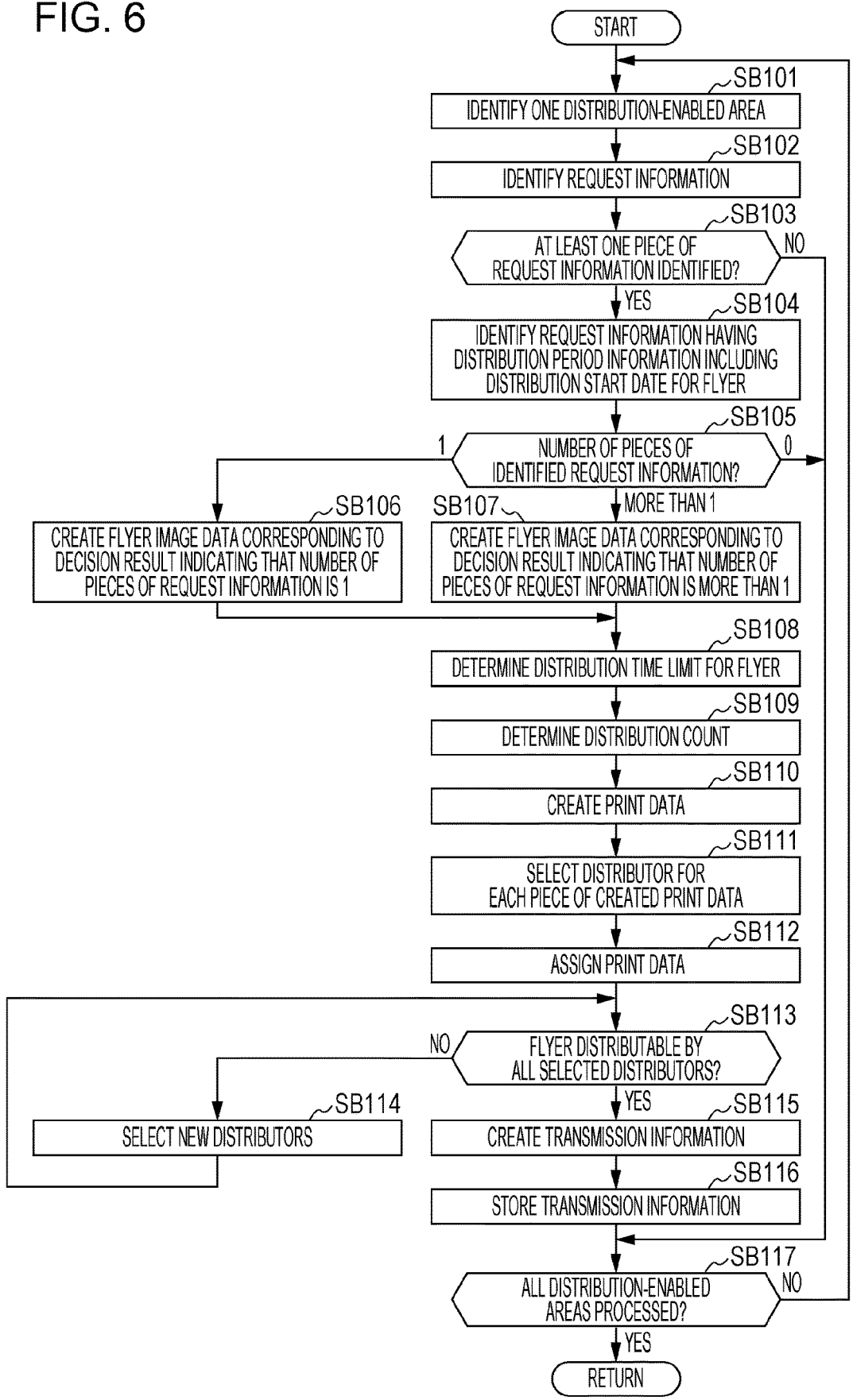
FIG. 6 is a flowchart illustrating the operation of a posting server.

FIG. 6 is a flowchart FE illustrating the operation of the posting server 1 in print data creation processing.

The server control section 10 in the posting server 1 identifies one distribution-enabled area eligible for processing in steps SB102 to SB116 (step SB101). A distribution-enabled area is an area in which the posting agency 1A can cause the distributor 4 to distribute the flyer TS.

A plurality of distribution-enabled areas are indicated in the posting server 1 in advance. The server control section 10 identifies one from the plurality of distribution-enabled areas indicated in the posting server 1. For example, when three distribution-enabled areas, area A, area B and area C, are indicated in the posting server 1, the server control section 10 identifies the area A in step SB101. Although it is preferable for the plurality of distribution-enabled areas indicated in the posting server 1 not to overlap with one another, some of them may overlap.

The server control section 10 identifies request information 12C2 including desired distribution area information 1226 indicating the distribution-enabled area identified in step SB101, with reference to the request information management database 120C (step SB102).

It will be assumed that, for example, the server control section 10 identifies the area A as the distribution-enabled area in step SB101. It will also be assumed that, for example, the advertisers 2A-1, 2A-2, 2A-3, 2A-4, and 2A-5 illustrated in FIG. 1 request the distribution of a flyer TS so that the advertisers 2A-1, 2A-2, 2A-3, and 2A-4 desire to distribute the flyer TS in the area A and the advertiser 2A-5 desires to distribute the flyer TS in the area B. That is, it will be assumed that the desired distribution area information 1226 included in the request information 12C2 from the advertisers 2A-1, 2A-2, 2A-3, and 2A-4 indicates the area A, and the desired distribution area information 1226 included in the request information 12C2 from the advertiser 2A-5 indicates the area B. In this case, the server control section 10 identifies, from the request information management database 120C, the request information 12C2 from the advertisers 2A-1, 2A-2, 2A-3, and 2A-4.

Next, the server control section 10 decides whether at least one piece of request information 12C2 could be identified in step SB102 (step SB103).

When the server control section 10 decides that at least one piece of request information 12C2 could be identified in step SB102 (Yes in step SB103), the server control section 10 executes processing in step SB104. When the server control section 10 decides that request information 12C2 could not be identified in step SB102 (No in step SB103), the server control section 10 executes processing in step SB117. Processing in step SB117 will be described later.

From the request information 12C2 identified in step SB102, the server control section 10 identifies request information 12C2 having distribution period information 1224 including a distribution start date for the flyer TS, the distribution start date being based on print data created this time (step SB104). It will be assumed that, for example, the posting server 1 is arranged so as to create print data used to issue the flyer TS the day before the distribution start date for the flyer TS. In this case, the server control section 10 identifies request information 12C2 having distribution period information 1224 that includes the next day after the date on which print data creation processing was started.

Next, the server control section 10 decides whether the number of pieces of request information 12C2 identified in step SB104 is 0, 1, or more than 1 (step SB105).

When the server control section 10 decides that the number of pieces of request information 12C2 identified in step SB104 is 0 (0 in step SB105), the server control section 10 executes processing in step SB117.

When the server control section 10 decides that the number of pieces of request information 12C2 identified in step SB104 is 1 (1 in step SB105), the server control section 10 creates flyer image data TGD corresponding to the decision result indicating that the number of pieces of request information 12C2 is 1 (step SB106). Flyer image data TGD is image data indicating one image to be printed on the whole of the flyer TS. In the description below, an image indicated by flyer image data TGD will be referred to as a flier image TG. As will be clarified later, a flier image TG includes advertisement images KG of one or a plurality of advertisers 2A.

Here, processing in step SB106 will be described.

For example, the server control section 10 creates flyer image data TGD the size of which has been adjusted so that the advertisement image KG indicated by advertisement image data 1223 included in one piece of request information 12C2 identified in step SB104 is printed over the whole of the flyer TS without depending on the advertisement cost set for the advertisement image KG.

For example, the server control section 10 also creates flyer image data TGD that includes the advertisement image KG indicated by the advertisement image data 1223 included in one piece of request information 12C2 identified in step SB104 and also includes an image prepared by the posting agency 1A in advance. In this case, the size of the advertisement image KG printed on the flyer TS depends on the advertisement cost set for the advertisement image KG. The image prepared by the posting agency 1A in advance is, for example, an image calling for advertisements to be placed on the flyer TS.

Returning to step SB105, when the server control section 10 decides that the number of pieces of request information 12C2 identified in step SB104 is more than 1 (more than 1 in step SB105), the server control section 10 creates flyer image data TGD corresponding to the decision result indicating that the number of pieces of request information 12C2 is more than 1 (step SB107).

Here, processing in step SB107 will be described by using a plurality of examples.

Example 1

In example 1, the server control section 10 creates flyer image data TGD matching the advertisement cost indicated by the advertisement cost information 1228 included in the request information 12C2.

Figure 7:
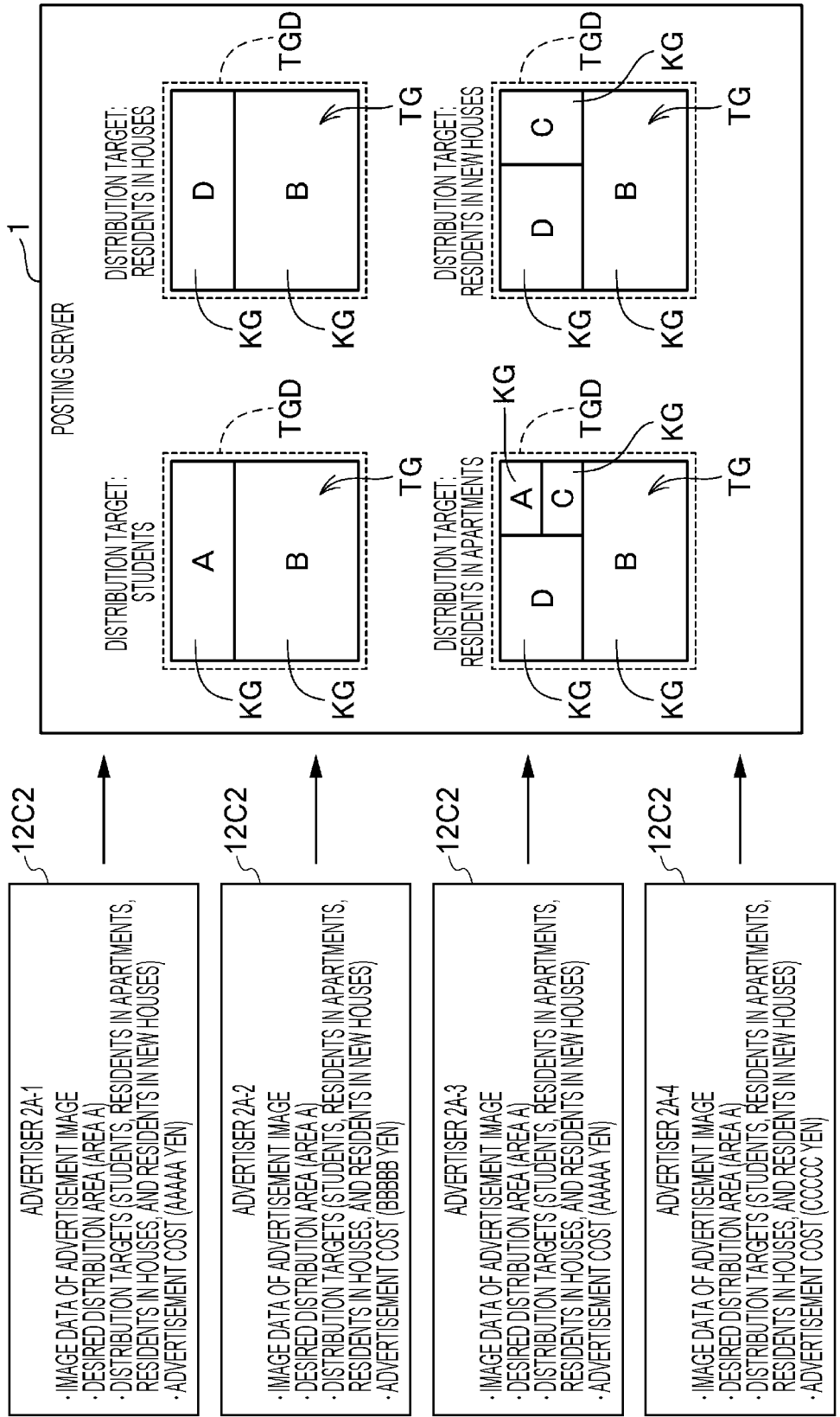
FIG. 7 illustrates how flyer image data is created.

FIG. 7 illustrates how flyer image data TGD is created.

In FIG. 7, it will be assumed that request information 12C2 from each of the advertisers 2A-1, 2A-2, 2A-3, and 2A-4 has been identified in steps SB102 and SB104.

It will also be assumed that request information 12C2 from each of the advertisers 2A-1, 2A-2, 2A-3, and 2A-4 includes desired distribution area information 1226 indicating the area A.

In FIG. 7, it will also be assumed that request information 12C2 from each of the advertisers 2A-1, 2A-2, 2A-3, and 2A-4 includes distribution target information 1227 indicating "students", "residents in apartments", "residents in houses", and "residents in new houses" as targets to which to distribute the flyer TS.

In FIG. 7, it will also be assumed that that request information 12C2 from each of the advertisers 2A-1 and 2A-3 includes advertisement cost information 1228 indicating AAAAA yen, request information 12C2 from the advertiser 2A-2 includes advertisement cost information 1228 indicating BBBBB yen, and request information 12C2 from the advertiser 2A-4 includes advertisement cost information 1228 indicating CCCCC yen. In FIG. 7, CCCCC yen is higher than AAAAA yen, and BBBBB yen is higher than CCCCC yen. In FIG. 7, therefore, the advertisement cost set by the advertiser 2A-2 is the highest, followed by the advertisement cost set by the advertiser 2A-4. The advertisement costs set by the advertisers 2A-1 and 2A-3, which are equal, are the lowest.

The server control section 10 creates flyer image data TGD for each distribution target indicated by distribution target information 1227. That is, in the example in FIG. 7, the server control section 10 creates flyer image data TGD for each distribution target of "students", "residents in apartments", "residents in houses", and "residents in new houses".

In FIG. 7, the server control section 10 selects the advertisement image KG of the advertiser 2A-2 to whom the highest advertisement cost is charged as the advertisement image KG to be included in the flier images TG targeted at "students", "residents in apartments", "residents in houses", and "residents in new houses". In FIG. 7, the advertisement image KG assigned the letter B is the advertisement image KG of the advertiser 2A-2.

The server control section 10 also selects the advertisement image KG of the advertiser 2A-4 to whom the second-highest advertisement cost is charged as the advertisement image KG to be included in the flier images TG targeted at "residents in apartments", "residents in houses", and "residents in new houses". In FIG. 7, the advertisement image KG assigned the letter D is the advertisement image KG of the advertiser 2A-4.

The server control section 10 also selects the advertisement image KG of the advertiser 2A-1 to whom the lowest advertisement cost, equal to the advertisement cost charged to the advertiser 2A-3, is charged as the advertisement image KG to be included in the flier images TG targeted at "students" and "residents in apartments". In FIG. 7, the advertisement image KG assigned the letter A is the advertisement image KG of the advertiser 2A-1.

The server control section 10 also selects the advertisement image KG of the advertiser 2A-3 to whom the lowest advertisement cost, equal to the advertisement cost charged to the advertiser 2A-1, is charged as the advertisement image KG to be included in the flier images TG targeted at "residents in apartments" and "residents in houses". In FIG. 7, the advertisement image KG assigned the letter C is the advertisement image KG of the advertiser 2A-3.

When the server control section 10 selects advertisement images KG as described above, the advertisement image KG of the advertiser 2A-2 involved in the highest advertisement cost is included in the flier images TG intended for all distribution targets, "students", "residents in apartments", "residents in houses" and "residents in new houses", as illustrated in FIG. 7. Also as indicated in FIG. 7, the advertisement image KG of the advertiser 2A-4 involved in the second-highest advertisement cost is included in the flier images TG intended for three distribution targets, "residents in apartments", "residents in houses" and "residents in new houses". Also as indicated in FIG. 7, the advertisement image KG of the advertiser 2A-1 involved in the lowest advertisement cost, which is equal to advertisement cost charged to the advertiser 2A-3, is included in the flier images TG intended for two distribution targets, "students" and "residents in apartments". Also as indicated in FIG. 7, the advertisement image KG of the advertiser 2A-3 involved in the lowest advertisement cost, which is equal to advertisement cost charged to the advertiser 2A-1, is included in the flier images TG intended for two distribution targets, "residents in apartments" and "residents in houses".

As described above, when the server control section 10 creates a plurality of pieces of flyer image data TGD, the server control section 10 selects advertisement images KG according to a degree matching the advertisement cost set for each advertisement image KG. To be more specific, the higher the set advertisement cost is, the more the server control section 10 selects advertisement images KG so that they are included in more flier images TG. Thus, the advertisement system 100 can vary the frequency with which an advertisement image KG appears on different types of flyers TS, depending on the advertisement cost. When advertisements of a plurality of advertisers 2A are placed on a flyer TS, therefore, the advertisement system 100 can assure fairness in advertisement costs set by the plurality of advertisers 2A.

After the server control section 10 has selected advertisement images KG to be included in flier images TG for distribution targets, "students", "residents in apartments", "residents in houses" and "residents in new houses", the server control section 10 adjusts the layout of the selected advertisement images KG according to the set advertisement costs.

In FIG. 7, the advertisement images KG of the advertisers 2A-1 and 2A-2 are selected as the advertisement images KG to be included in the flier image TG targeted at "students". In FIG. 7, the advertisement cost set by the advertiser 2A-2 is higher than the advertisement cost set by the advertiser 2A-1 as described above. In creation of flyer image data TGD targeted at "students", therefore, the server control section 10 adjusts the sizes of the advertisement images KG of the advertisers 2A-1 and 2A-2 so that the advertisement image KG of the advertiser 2A-2 becomes larger than the advertisement image KG of the advertiser 2A-1. Specifically, these sizes may be adjusted according to advertisement costs or the ratio between the advertisement cost set by the advertiser 2A-1 and the advertisement cost set by the advertiser 2A-2.

In FIG. 7, the advertisement images KG of the advertisers 2A-1, 2A-2, 2A-3, and 2A-4 are selected as the advertisement images KG to be included in the flier image TG targeted at "residents in apartments". In FIG. 7, the advertisement cost set by the advertiser 2A-2 is the highest, followed by the advertisement cost set by the advertiser 2A-2, and the advertisement costs set by the advertisers 2A-1 and 2A-3, which are equal, are the lowest, as described above. In creation of flyer image data TGD targeted at "residents in apartments", therefore, the server control section 10 adjusts the sizes of the advertisement images KG so that the advertisement image KG of the advertiser 2A-2 has the largest size, the advertisement image KG of the advertiser 2A-4 has the second largest size, next to the advertisement image KG of the advertiser 2A-2, and the advertisement images KG of the advertisers 2A-1 and 2A-3 have the same size, which is smaller than the advertisement image KG of the advertisers 2A-2 and 2A-4.

In FIG. 7, the advertisement images KG of the advertisers 2A-2, 2A-3, and 2A-4 are selected as the advertisement images KG to be included in the flier image TG targeted at "residents in residents in new houses". In creation of flyer image data TGD targeted at "residents in new houses", therefore, the server control section 10 adjusts the sizes of the advertisement images KG so that the advertisement image KG of the advertiser 2A-2 has the largest size, the advertisement image KG of the advertiser 2A-4 has the second largest size, next to the advertisement image KG of the advertiser 2A-2, and the advertisement image KG of the advertiser 2A-3 have the smallest size.

In FIG. 7, the advertisement images KG of the advertisers 2A-2 and 2A-4 are selected as the advertisement images KG to be included in the flier image TG targeted at "residents in houses". In creation of flyer image data TGD targeted at "residents in houses", therefore, the server control section 10 adjusts the sizes of the advertisement images KG so that the advertisement image KG of the advertiser 2A-2 has a larger size than the advertisement image KG of the advertiser 2A-4.

As described above, in creation of flyer image data TGD, the server control section 10 adjusts, for each selected advertisement image KG, the layout of the advertisement images KG according to the advertisement cost set for each advertisement image KG. To be more specific, the server control section 10 adjusts the size of each advertisement image KG so that the higher the set advertisement cost is, the larger the size is. Thus, the advertisement system 100 can vary the layout of a plurality of advertisement images KG to be printed on one type of flyer TS depending on the set advertisement costs. When advertisements of a plurality of advertisers 2A are placed on a flyer TS, therefore, the advertisement system 100 can assure fairness in advertisement costs set by the plurality of advertisers 2A.

Adjustment of the layout of advertisement images KG is not limited to adjustment of the sizes of the advertisement images KG. The positions of the advertisement images KG and the like may be additionally adjusted.

Example 2

In example 2, the server control section 10 selects advertisement images KG according to the distribution targets indicated by distribution target information 1227 included in request information 12C2, and creates flyer image data TGD.

Figure 8:
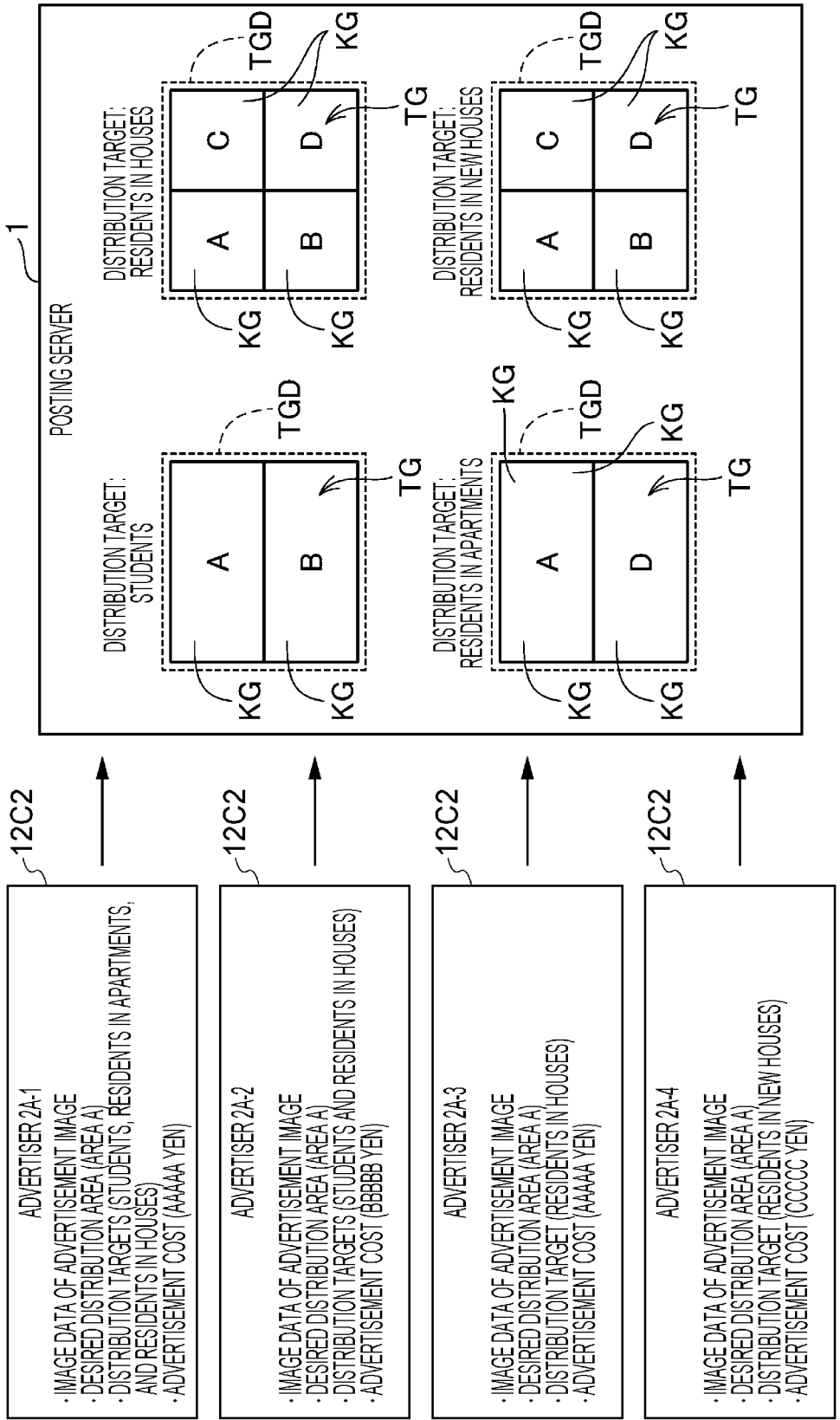
FIG. 8 also illustrates how flyer image data is created.

FIG. 8 illustrates how flyer image data TGD is created.

In FIG. 8, it will be assumed that request information 12C2 from each of the advertisers 2A-1, 2A-2, 2A-3, and 2A-4 has been identified in steps SB102 and SB104. It will also be assumed that request information 12C2 from each of the advertisers 2A-1, 2A-2, 2A-3, and 2A-4 includes desired distribution area information 1226 indicating the area A.

In FIG. 8, it will also be assumed that request information 12C2 from the advertiser 2A-1 includes distribution target information 1227 indicating "students", "residents in apartments", and "residents in houses" as targets to which to distribute the flyer TS. It will also be assumed that request information 12C2 from the advertiser 2A-2 includes distribution target information 1227 indicating "students" and "residents in houses" as targets to which to distribute the flyer TS. It will also be assumed that request information 12C2 from the advertiser 2A-3 includes distribution target information 1227 indicating "residents in houses" as a target to which to distribute the flyer TS. It will also be assumed that request information 12C2 from the advertiser 2A-4 includes distribution target information 1227 indicating "residents in new houses" as a target to which to distribute the flyer TS.

In FIG. 8, the server control section 10 creates flyer image data TGD for each distribution target of "students", "residents in apartments", "residents in houses", and "residents in new houses" as in FIG. 7.

The server control section 10 selects the advertisement images KG of the advertisers 2A-1 and 2A-2 as the advertisement images KG to be included in the flier image TG targeted at "students". In FIG. 8, the advertisement image KG assigned the letter A is the advertisement image KG of the advertiser 2A-1 and the advertisement image KG assigned the letter B is the advertisement image KG of the advertiser 2A-2.

Next, the server control section 10 selects the advertisement images KG of the advertisers 2A-1 and 2A-4 as the advertisement images KG to be included in the flier image TG targeted at "residents in apartments". In FIG. 8, the advertisement image KG assigned the letter D is the advertisement image KG of the advertiser 2A-4. Here, the request information 12C2 from the advertiser 2A-4 does not have distribution target information 1227 indicating "residents in apartments" but has distribution target information 1227 indicating "residents in new houses". However, the server control section 10 decides that "residents in apartments" and "residents in new houses" are distribution targets related to each other, and selects the advertisement image KG of the advertiser 2A-4. A decision as to whether distribution targets are related to each other is made according to information involved in a predetermined relationship among distribution targets.

Next, the server control section 10 selects the advertisement images KG of the advertisers 2A-1, 2A-2, 2A-3, and 2A-4 as the advertisement images KG to be included in the flier image TG targeted at "residents in houses". In FIG. 8, the advertisement image KG assigned the letter C is the advertisement image KG of the advertiser 2A-3. Here, the request information 12C2 from the advertiser 2A-4 does not have distribution target information 1227 indicating "residents in houses" but has distribution target information 1227 indicating "residents in new houses". However, the server control section 10 decides that "residents in houses" and "residents in new houses" are distribution targets related to each other, and selects advertisement images KG as described above.

Next, the server control section 10 selects the advertisement images KG of the advertisers 2A-1, 2A-2, 2A-3, and 2A-4 as the advertisement images KG to be included in the flier image TG targeted at "residents in new houses". Here, the request information 12C2 other than from the advertiser 2A-4 does not have distribution target information 1227 indicating "residents in new houses". However, the server control section 10 decides that "residents in houses" and "residents in new houses" are distribution targets related to each other, and selects the advertisement image KG of the advertisers 2A-1, 2A-2, 2A-3, and 2A-4.

As described above, when creating flyer image data TGD, the server control section 10 selects advertisement images KG having a relationship in the set distribution targets. Since a plurality of advertisements having a relationship in distribution targets can thus be placed on a flyer TS, the advertisement system 100 can place many advertisements useful for viewers on the flyer TS. Therefore, the advertisement system 100 can further attract views' interests in the flyer TS, so the advertisement effect of the flyer TS can be enhanced.

Processing in step SB107 is not limited to examples 1 and 2 described above. For example, to create flyer image data TGD, the server control section 10 may combine processing in example 1 and processing in example 2 together to select advertisement images KG and adjust the layout of the selected advertisement images KG. Alternatively, to create flyer image data TGD the server control section 10 may select advertisement images KG and adjust the layout of the selected advertisement images KG according to various types of information included in request information 12C2, for example.

Returning to the flowchart in FIG. 6, for each piece of flyer image data TGD created in step SB106 or SB107, the server control section 10 determines a distribution time limit for the flyer TS (step SB108).

Step SB108 will be described in detail.

Here, the flyer image data TGD, illustrated in FIG. 7, targeted at "students" will be taken as an example. It will be assumed that a desired distribution period set for the advertisement image KG of the advertiser 2A-1 is shorter than a desired distribution period set for the advertisement image KG of the advertiser 2A-2. Then, for the flyer image data TGD, illustrated in FIG. 7, targeted at "students", the server control section 10 determines a distribution time limit of the shorter desired distribution period set for the advertisement image KG of the advertiser 2A-1 as a distribution time limit for the flyer TS.

Next, the server control section 10 determines a distribution count for the flyer TS for each piece of flyer image data TGD created in step SB106 or SB107 (step SB109).

For example, when one distributor 4 distributes a flyer TS based on one piece of flyer image data TGD, the server control section 10 determines a distribution count for the flyer TS for each piece of flyer image data TGD by a predetermined method so that the maximum count up to which the one distributor 4 can distribute the flyer TS is not exceeded. The maximum count for the one distributor 4 is determined in advance. The server control section 10 also determines a distribution count for the flyer TS for each piece of flyer image data TGD by a predetermined method so that a total distribution count for the flyer TS on which an advertisement of a certain advertiser 2A is placed does not exceed a desired distribution count requested by the advertiser 2A for the flyer TS.

Next, the server control section 10 creates print data used to issue the flyer TS by the distribution count determined in step SB109, for each piece of flyer image data TGD created in step SB106 or SB107 (step SB110). This print data includes flyer image data TGD, information indicating a distribution count for the flyer TS based on the flyer image data TGD, print commands, and other data.

After the print data has been created in step SB110, the server control section 10 references the distributor management database 120B and selects a distributor 4 to whom the distribution-enabled area identified in step SB101 is assigned for each piece of created print data (step SB111). Processing to select a distributor 4 with reference to the distributor management database 120B is specifically to select a record stored in the distributor management database 120B.

When, for example, the distribution-enabled area identified in step SB101 is the area A and four pieces of print data were created, the server control section 10 references the distributor management database 120B and selects four records including assigned area information 12B2 indicating the area A. Any reference can be used as a reference for record selection. When the distributor management database 120B illustrated in FIG. 3 is referenced, the server control section 10 selects records R1, R2, R3, and R4, for example.

Next, the server control section 10 assigns one piece of print data created in step SB110 for each distributor 4 selected in step SB111 (step SB112). Any reference can be used as a reference for assignment.

Next, the server control section 10 decides whether all of the distributors 4 selected in step SB110 can distribute the flyer TS issued according to the assigned print data before the distribution time limit determined in step SB108 in correspondence to the print data (step SB113). For example, the server control section 10 compares the distribution time limit corresponding to the print data assigned to a certain distributor 4 with the date and time indicated by the distribution disapproved date and time information 12B3 corresponding to the distributor ID 12B1 of the distributor 4 to make a decision in step SB113.

When the server control section 10 makes an affirmative decision in step SB113, the server control section 10 executes processing in step SB115.

When the server control section 10 makes a negative decision in step SB113, the server control section 10 references the distributor management database 120B and selects as many new distributors 4 as there are distributors 4 indicating the inability to distribute the flyer TS (step SB114). In the selection of new distributors 4, the server control section 10 preferentially selects distributors 4 to whom the distribution-enabled area identified in step SB101 is assigned. Then, the server control section 10 executes processing in step SB112 again.

The server control section 10 creates transmission information for the distributor ID 12B1 of each distributor 4 selected in step SB111 or in steps SB111 and SB114 (step SB115).

Transmission information has a correspondence with the distributor ID 12B1 of a distributor 4, print data assigned to the distributor 4 in step SB112, information indicating the distribution time limit determined in step SB108 in correspondence with flyer image data TGD included in the print data, information indicating the distribution-enabled area identified in step SB101, information indicating a distribution target for the flyer TS issued by being printed according to the print data, and the request information ID 12C1 corresponding to the advertisement image KG selected during creation of the flyer image data TGD included in the print data.

When, for example, the distributor 4 who distributes the flyer TS targeted at "students" as in FIG. 7 is the distributor 4-1 in FIG. 1, the server control section 10 creates transmission information that has a correspondence with the distributor ID 12B1 of the distributor 4-1, print data that commands the issuing of a flyer TS on which flier images TG including the advertisement images KG of the advertisers 2A-1 and 2A-2, information indicating the area A, information indicating "students" as the distribution target, information indicating a distribution time limit for the flyer TS issued by being printed according to the print data, and the request information IDs 12C1 of request information 12C2 from the advertisers 2A-1 and 2A-2.

After having created the transmission information, the server control section 10 stores the created transmission information in a predetermined area in the server storage section 120 (step SB116).

Next, the server control section 10 decides whether all distribution-enabled areas indicated in the posting server 1 have been processed (step SB117). When the server control section 10 decides that all distribution-enabled areas indicated in the posting server 1 have not been processed (No in step SB117), the server control section 10 returns to step SB101 and executes processing in steps SB102 to SB116 for distribution-enabled area that have yet to be processed.

When the server control section 10 decides that all distribution-enabled areas indicated in the posting server 1 have been processed (Yes in step SB117), the server control section 10 terminates the print data creation processing and executes processing in step SB5 illustrated in FIG. 5.

Returning to the flowchart FB in FIG. 5, after having executed print data creation processing, the server control section 10 decides whether a request for transmission information was received from the distributor PC 5 (step SB5).

Although a step is not illustrated, the application executing section 5000 in the distributor PC control section 50 in the distributor PC 5 transmits a request for transmission information to the posting server 1 through the distributor PC network communication section 51. This request includes the distributor ID 12B1 of the distributor 4 who manipulates the distributor PC 5.

When the server control section 10 decides that a request for transmission information was received from the distributor PC 5 (Yes in step SB5), the server control section 10 identifies transmission information including the distributor ID 12B1 included in the request from the server storage section 120, and transmits the identified transmission information to the distributor PC 5 through the server network communication section 11 (step SB6).

Referring to the flowchart FC in FIG. 5, the application executing section 5000 in the distributor PC control section 50 in the distributor PC 5 receives the transmission information through the distributor PC network communication section 51 (step SC1). The transmission information includes information indicating a distribution time limit for the flyer TS, so the distributor PC 5 is notified of the distribution time limit for the flyer TS. Thus, the distributor 4 can recognize, on the distributor PC 5, the distribution time limit for the flyer TS issued according to the print data transmitted from the posting server 1. Therefore, the advertisement system 100 can prevent the distributor 4 from still distributing the flyer TS after the expiration of the distribution time limit, making it possible to provide, to advertisers 2A, a service that is highly reliable in the distribution time limit when the flyer TS is distributed.

Next, the application executing section 5000 decides whether a command to issue the flyer TS was received (step SC2).

When the application executing section 5000 decides that a command to issue the flyer TS was received (Yes in step SC2), the application executing section 5000 transmits print data included in the received transmission information to the printer 3 through the distributor PC communication section 52 (step SC3).

Referring to the flowchart FD in FIG. 5, the printer control section 30 in the printer 3 receives the print data through the printer communication section 31 (step SD1). The printer control section 30 then controls the printing section 32 to have it execute printing according to the print data and issue as many copies of the flyer TS as the distribution count indicated in the print data (step SD2).

As described above, in the advertisement system 100, the posting server 1 selects a plurality of advertisement images KG from advertisement images KG of different advertisers 2A, according to the desired distribution period, set for each advertisement image KG, for the flyer TS. The advertisement system 100 creates print data involved in printing the plurality of advertisement images KG selected by the posting server 1 and transmits the created print data to the printer 3. The advertisement system 100 then issues the flyer TS according to the print data received by the printer 3.

Since the advertisement system 100 can thus issue a flyer TS on which a plurality of advertisement images KG of different advertisers 2A with the printer 3, it is possible to issue a flyer TS on which advertisements of a plurality of advertisers 2A are placed. In addition, since the advertisement system 100 can place advertisements of a plurality of advertisers 2A on a flyer TS, it is also possible to suppress costs imposed on the plurality of advertisers 2A to place advertisements on the flyer TS.

Next, the operation of the advertisement system 100 after the distribution of the flyer TS by the distributor 4 will be described.

Figure 9:
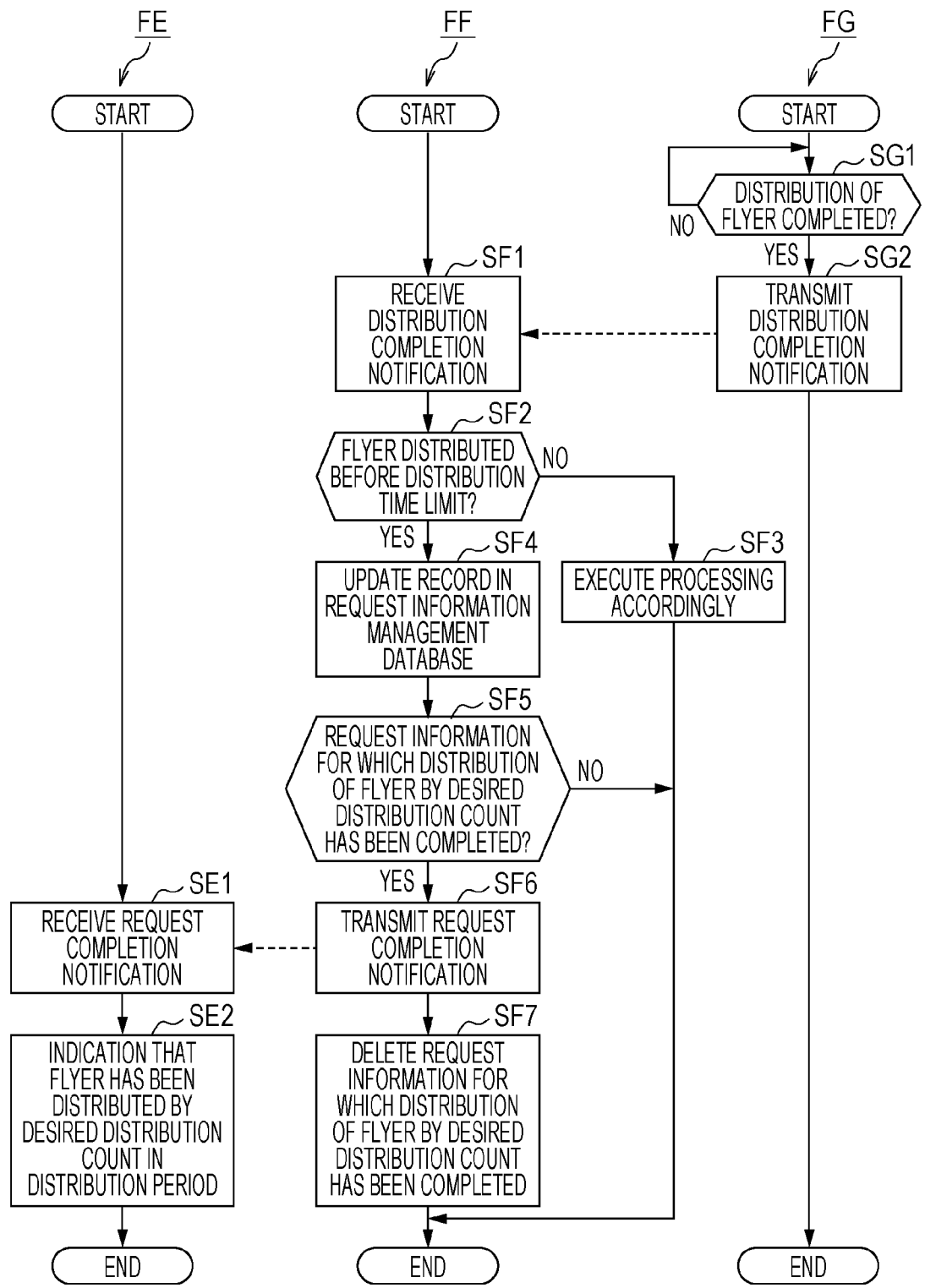
FIG. 9 is flowcharts illustrating the operation of the advertisement system.

FIG. 9 is flowcharts illustrating the operation of the advertisement system 100. In FIG. 9, the flowchart FE indicates the operation of the advertiser PC 2, the flowchart FF indicates the operation of the posting server 1, and the flowchart FG indicates the operation of the distributor PC 5.

As illustrated in the flowchart FG, the application executing section 5000 in the distributor PC control section 50 in the distributor PC 5 decides whether the distribution of the flyer TS has been completed (step SG1).

For example, the distributor PC display section 53 displays a user interface used to make an input to indicate the completion of the distribution of the flyer TS by a function of the special app 520B. When an input to indicate the completion of the distribution of the flyer TS is made through the user interface, the application executing section 5000 makes an affirmative decision in step SG1.

When the application executing section 5000 decides that the distribution of the flyer TS has been completed (Yes in step SG1), the distributor PC network communication section 51 transmits a distribution completion notification to the posting server 1 (step SG2). The distribution completion notification includes all request information IDs 12C1 included in transmission information received from the posting server 1, information indicating the distribution count included in the transmission information, information indicating the distribution time limit included in the transmission information, and information indicating the date and time at which the distribution of the flyer TS was completed.

Referring to the flowchart FF in FIG. 9, the server control section 10 in the posting server 1 receives the distribution completion notification from the distributor PC 5 through the server network communication section 11 (step SF1).

Next, the server control section 10 decides whether the distributor 4 has distributed the flyer TS before the distribution time limit, according to the information indicating the distribution time limit included in the received distribution completion notification and to the information indicating the date and time at which the distribution of the flyer TS was completed (step SF2).

When the server control section 10 decides that the distributor 4 has not distributed the flyer TS before the distribution time limit (No in step SF2), the server control section 10 executes processing accordingly (step SF3) and terminates the processing in the flowchart FF. As an example of the processing executed accordingly, the server control section 10 notifies the advertiser 2A corresponding to the request information ID 12C1 included in the distribution completion notification that the flyer TS could not be distributed before the distribution time limit.

When the server control section 10 decides that the distributor 4 has distributed the flyer TS before the distribution time limit (Yes in step SF2), the server control section 10 updates a record in the request information management database 120C according to the request information ID 12C1 included in the received transmission information and to the information indicating the distribution count (step SF4).

It will be assumed that, for example, the distribution completion notification includes the request information IDs 12C1 of the request information 12C2 from the advertisers 2A-1 and 2A-2 as well as information indicating a distribution count indicating 100 copies. It will also be assumed that a record including the request information 12C2 from the advertiser 2A-1 is stored in the request information management database 120C and that the record includes remaining count information 12C3 indicating 200 copies. It will also be assumed that a record including the request information 12C2 from the advertiser 2A-2 is stored in the request information management database 120C and that the record includes remaining count information 12C3 indicating 100 copies. Then, the server control section 10 subtracts the distribution count indicated in the distribution completion notification from the remaining count indicated in each record to update the remaining count information 12C3 in the record.

The server control section 10 decides whether there is request information 12C2 for which the distribution of the flyer TS by the desired distribution count has been completed as the result of the update in step SF4 (step SF5).

When the server control section 10 makes a negative decision in step SF5, the server control section 10 terminates the processing in the flowchart FF. When the server control section 10 makes an affirmative decision in step SF5, the server control section 10 transmits a request completion notification to the advertiser 2A of the request information 12C2 the distribution of the flyer TS by the desired distribution count has been completed (step SF6). The request completion notification includes information indicating that the flyer TS has been distributed by the desired distribution count in the set distribution period.

After having transmitted the request completion notification to the advertiser 2A, the server control section 10 deletes, from the request information management database 120C, the request information 12C2 for which the distribution of the flyer TS by the desired distribution count has been completed (step SF7).

Referring the flowchart FE in FIG. 9, the advertiser PC 2 receives the request completion notification (step SE1), after which the advertiser PC 2 makes a notification that the flyer TS has been distributed by the desired distribution count in the distribution period set on the display panel or the like, according to the received request completion notification (step SE2).

Thus, the server control section 10 monitors whether the flyer TS has been distributed before the distribution time limit, for the flyer TS, of which the distributor PC 5 was notified, and notifies the advertiser 2A of a monitoring result. This enables the advertiser 2A to recognize whether the flyer TS has been distributed within the distribution period, so the advertisement system 100 can provide a service to distribute the flyer TS in such a way that the advertiser 2A can easily recognize the distribution state of the flyer TS.

As described above, an advertisement system 100 has a printer 3 and a posting server 1 that can communicate with the printer 3. The advertisement system 100 uses the printer 3 to issue a flyer TS on which advertisement images KG are printed. The posting server 1 acquires a plurality of advertisement images KG of different advertisers 2A, selects a plurality of advertisement images KG from the plurality of acquired advertisement images KG according to a distribution period for the flyer TS, the distribution period being set for each acquired advertisement image KG, creates print data involved in printing the plurality of selected advertisement images KG, and transmits the created print data to the printer 3. The printer 3 receives the print data created by the posting server 1, and to issue the flyer TS, executes printing according to the received print data.

In a method of controlling the advertisement system 100, the posting server 1 acquires a plurality of advertisement images KG of different advertisers 2A, selects a plurality of advertisement images KG from the plurality of acquired advertisement images KG according to a distribution period for the flyer TS, the distribution period being set for each acquired advertisement image KG, creates print data involved in printing the plurality of selected advertisement images KG, and transmits the created print data to the printer 3. The printer 3 receives the print data created by the posting server 1, and to issue the flyer TS, executes printing according to the received print data.

According to the advertisement system 100 and the method of controlling the advertisement system 100, a flyer TS on which a plurality of advertisement images KG of different advertisers 2A are printed with the printer 3 can be issued, so a flyer TS on which advertisements of a plurality of advertisers 2A are placed can be issued. Since the advertisement system 100 selects a plurality of advertisement images KG according to the distribution period for the flyer TS, the distribution period being set for each advertisement image KG, it is possible to issue a flyer TS on which a plurality of advertisements for which distribution periods for the flyer TS are overlaped, for example. Since the advertisement system 100 can place advertisements of a plurality of advertisers 2A on the flyer TS, it is also possible to suppress costs imposed on the plurality of advertisers 2A to place advertisements on the flyer TS.

An advertisement cost is set by the advertiser 2A for each advertisement image KG acquired by the posting server 1. When creating a plurality of pieces of print data, the posting server 1 selects advertisement images KG according to a degree matching the advertisement cost set for each advertisement image KG.

According to this arrangement, the advertisement system 100 can vary the frequency with which an advertisement image KG appears on different types of flyers TS, depending on the advertisement cost. When advertisements of a plurality of advertisers 2A are placed on a flyer TS, therefore, the advertisement system 100 can assure fairness in set advertisement costs.

As described above, an advertisement cost is set by the advertiser 2A for each advertisement image KG acquired by the posting server 1. The posting server 1 adjusts, for each selected advertisement image KG, the layout of the advertisement images KG according to the set advertisement cost.

According to this arrangement, the advertisement system 100 can vary the layout of a plurality of advertisement images KG to be printed on one type of flyer TS depending on the set advertisement costs. When advertisements of a plurality of advertisers 2A are placed on a flyer TS, therefore, the advertisement system 100 can assure fairness in set advertisement costs.

A distribution target for the flyer TS is set by the advertiser 2A for each advertisement image KG acquired by the posting server 1. In creation of print data, the posting server 1 selects advertisement images KG having a relationship in set distribution targets.

According to this arrangement, since advertisements distribution targets having a relationship in distribution targets can be placed on one type of flyer TS, the advertisement system 100 can place many advertisements useful for viewers on the flyer TS. Therefore, the advertisement system 100 can further attract views' interests in the flyer TS, so the advertisement effect of the flyer TS can be enhanced.

The advertisement system 100 has a distributor PC 5 used by a distributor 4 who distributes the flyer TS. The distributor PC 5 can communicate with the posting server 1 and printer 3. The distributor PC 5 receives print data from the posting server 1 and transmits the received print data to the printer 3. The posting server 1 transmits the created print data to the distributor PC 5 and notifies the distributor PC 5 of a distribution time limit for the flyer TS issued according to the print data.

According to this arrangement, the distributor 4 can recognize, on the distributor PC 5, the distribution time limit for the flyer TS issued according to the print data transmitted from the posting server 1. Therefore, the advertisement system 100 can prevent the distributor 4 from still distributing the flyer TS after the expiration of the distribution time limit, making it possible to provide, to advertisers 2A, a service that is highly reliable in the distribution time limit when the flyer TS is distributed.

The posting server 1 monitors whether the flyer TS has been distributed before the distribution time limit, for the flyer TS, of which the distributor PC 5 was notified, and notifies the advertiser 2A of a monitoring result.

According to this arrangement, it becomes possible for the advertiser 2A to recognize whether the flyer TS has been distributed within the distribution period, so the advertisement system 100 can provide a service to distribute the flyer TS in such a way that the advertiser 2A can easily recognize the distribution state of the flyer TS.

The embodiment described above just indicates one aspect of the present disclosure. The embodiment can be arbitrarily modified and applied without departing from the intended scope of the present disclosure.

For example, transmission information created by the posting server 1 may include information indicating the address of a building or the like eligible for distribution. Thus, when, for example, the distributor 4 distributes the flyer TS to the distribution target indicated by transmission information in the area in charge, the distributor 4 can easily recognize the building to which to distribute the flyer TS. That is, when the distributor 4 distributes the flyer TS to the distribution target indicated by transmission information, the posting server 1 can assist the distributor 4. The posting server 1 stores predetermined map data. When the posting server 1 creates information indicating the address of a building or the like eligible for distribution, the posting server 1 references the predetermined map data.

For example, the advertisement system 100 may be structured so as to issue a flyer TS on which information indicating a distribution time limit is printed by the printer 3 together with flier images TG. In this structure, the posting server 1 creates print data according to which information indicating a distribution time limit determined for each piece of flyer image data TGD is also printed together with flier images TG, and includes the created print data in transmission information.

For example, in the embodiment described above, the printer 3 has been exemplified by a stationary printing apparatus. However, the printer 3 may be of portable type. The printer 3 and distributor PC 5 may not be disposed in the distributor dwelling 4A.

For example, in the embodiment described above, the posting server 1 has transmitted transmission information including print data to the distributor PC 5. However, the posting server 1 may transmit transmission information including flyer image data TGD instead of print data. In this case, the application executing section 5000 creates print data used to issue a flyer TS, according to flyer image data TGD included in the received transmission information.

Functions of the server control section 10, distributor PC control section 50, and printer control section 30 may be implemented by a plurality of processors or a semiconductor chip.

The sections illustrated in FIG. 2 are just an example. There is no particular limitation on a specific mounting method. That is, one piece of hardware does not necessarily need to be mounted in correspondence with one section. Of course, it is possible for one processor to execute programs to implement functions of individual sections. Furthermore, part of the functions implemented by software in the embodiment described above may be implemented by hardware. Alternatively, part of the functions implemented by hardware may be implemented by software. In addition, specific details of the structures of the posting server 1, distributor PC 5, printer 3, and other sections can also be arbitrarily modified without departing from the intended scope of the present disclosure.

For example, the flowcharts in FIGS. 5, 6 and 9 have been divided into operation steps according to main processing, so as to facilitate the understanding of the operations of each apparatus in the advertisement system 100. The present disclosure is not limited by the method of dividing a single piece of processing into steps or by a name. The flowcharts may be divided into more steps according to the processing. One step may be further divided so as to include more processing. The sequence of steps may be appropriately changed without causing a problem in the intended scope of the present disclosure.

What is claimed is:

1. An advertisement system having a printing apparatus and a server configured to communicate with the printing apparatus, the advertisement system using the printing apparatus to issue an advertisement medium on which an advertisement image is printed, wherein:

the server:
acquires a plurality of advertisement images of different advertisers,
acquires a distribution period for each of the plurality of advertisement images, the distribution period being a period, during which the issued advertisement medium is desired to be distributed, set by a corresponding advertiser,
selects a plurality of advertisement images from the plurality of acquired advertisement images according to the distribution periods for the plurality of advertisement images acquired from the different advertisers,
creates print data involved in printing the plurality of selected advertisement images, and
transmits the created print data to the printing apparatus; and the printing apparatus receives the print data created by the server, and executes printing according to the received print data to issue the advertisement medium, wherein:

the advertisement system has a terminal used by a distributer who distributes the advertisement medium;
the terminal, which is configured to communicate with the server and the printing apparatus, receives the print data from the server and transmits the received print data to the printing apparatus; and the server transmits the created print data to the terminal and notifies the terminal of a distribution time limit for the advertisement medium issued according to the print data.

2. The advertisement system according to claim 1, wherein:
an advertisement cost is set by the advertiser for each advertisement image acquired by the server; and
when creating a plurality of pieces of print data, the server selects an advertisement image according to a degree matching the set advertisement cost.

3. The advertisement system according to claim 1, wherein:
an advertisement cost is set by the advertiser for each advertisement image acquired by the server; and
the server adjusts, for each selected advertisement image, a layout of the advertisement image according to the set advertisement cost.

4. The advertisement system according to claim 1, wherein:
a distribution target for the advertisement medium is set by the advertiser for each advertisement image acquired by the server; and
in creation of the print data, the server selects the advertisement image having a relationship in the set distribution target.

5. The advertisement system according to claim 1, wherein the server monitors whether the advertisement medium was distributed before the distribution time limit, for the advertisement medium, of which the terminal was notified, and notifies the advertiser of a monitoring result.

6. A method of controlling an advertisement system having a printing apparatus and a server configured to communicate with the printing apparatus, the system using the printing apparatus to issue an advertisement medium on which an advertisement image is printed, wherein:
the server:
acquires a plurality of advertisement images of different advertisers,
acquires a distribution period for each of the plurality of advertisement images, the distribution period being a period, during which the issued advertisement medium is desired to be distributed, set by a corresponding advertiser,
selects a plurality of advertisement images from the plurality of acquired advertisement images according to the distribution periods of the plurality of advertisement images acquired from the different advertisers,
creates print data involved in printing the plurality of selected advertisement images, and
transmits the created print data to the printing apparatus; and
the printing apparatus receives the print data created by the server, and executes printing according to the received print data to issue the advertisement medium,
the advertisement system has a terminal used by a distributer who distributes the advertisement medium;
the terminal, which is configured to communicate with the server and the printing apparatus, receives the print data from the server and transmits the received print data to the printing apparatus; and
the server transmits the created print data to the terminal and notifies the terminal of a distribution time limit for the advertisement medium issued according to the print data.

\* \* \* \* \*